(12) United States Patent
Graham et al.

(10) Patent No.: US 11,997,365 B2
(45) Date of Patent: May 28, 2024

(54) SYSTEM AND METHOD OF CONTENT STREAMING AND DOWNLOADING

(71) Applicant: CHARTER COMMUNICATIONS OPERATING, LLC, St. Louis, MO (US)

(72) Inventors: Daniel Graham, Denver, CO (US); Rob Martel, Denver, CO (US); Angela Mitchell, Denver, CO (US); Christine Haefling, Lafayette, CO (US); Peter Brown, Greenwood Village, CO (US); Richard J. Digeronimo, Greenwood Village, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 221 days.

(21) Appl. No.: 15/008,438

(22) Filed: Jan. 27, 2016

(65) Prior Publication Data
US 2016/0360282 A1    Dec. 8, 2016

Related U.S. Application Data

(60) Provisional application No. 62/108,523, filed on Jan. 27, 2015.

(51) Int. Cl.
| | |
|---|---|
| *H04H 60/32* | (2008.01) |
| *H04L 9/40* | (2022.01) |
| *H04N 21/254* | (2011.01) |
| *H04N 21/266* | (2011.01) |
| *H04N 21/6334* | (2011.01) |
| *H04L 9/08* | (2006.01) |

(Continued)

(52) U.S. Cl.
CPC ......... *H04N 21/6334* (2013.01); *H04L 63/00* (2013.01); *H04N 21/2541* (2013.01); *H04N 21/26613* (2013.01); *H04L 9/0819* (2013.01); *H04L 2209/603* (2013.01); *H04N 21/2347* (2013.01); *H04N 21/25816* (2013.01)

(58) Field of Classification Search
CPC .......... H04N 21/4402; H04N 21/4408; H04N 21/4627; H04N 21/2347; H04N 21/2541
USPC ............................. 725/31, 87, 25, 110, 114
See application file for complete search history.

(56) References Cited

U.S. PATENT DOCUMENTS

| | | | |
|---|---|---|---|
| 2008/0209491 A1* | 8/2008 | Hasek | H04N 7/17318 725/114 |
| 2012/0084803 A1* | 4/2012 | Johansson | H04N 21/23106 725/25 |

(Continued)

*Primary Examiner* — Jivka A Rabovianski
(74) *Attorney, Agent, or Firm* — Patent Beach PC

(57) ABSTRACT

Systems, methods, architectures, mechanisms or apparatus for streaming content toward client devices, comprising a content delivery system configured to automatically ingest content asset packages and publish identifying data associated with content assets encrypted and stored therein at a content delivery network (CDN), a virtualized Digital Rights Management (DRM) platform configured to provide content encryption keys to the content delivery system and to authorized client devices, and a virtualized services platform configured to interact with client devices to authenticate client devices, receive client device content requests, and cause the CDN to transmit requested content to an authorized client device.

12 Claims, 6 Drawing Sheets

(51) Int. Cl.
    *H04N 21/2347* (2011.01)
    *H04N 21/258* (2011.01)

(56) References Cited

U.S. PATENT DOCUMENTS

| | | | |
|---|---|---|---|
| 2013/0347025 A1* | 12/2013 | Prakash | H04N 21/2541 725/25 |
| 2015/0074413 A1* | 3/2015 | Hao | H04L 63/123 713/176 |

* cited by examiner

SYSTEM AND METHOD OF CONTENT STREAMING AND DOWNLOADING

CROSS-REFERENCE TO RELATED APPLICATION

This application claims the benefit of provisional patent application Ser. No. 62/108,523 filed on Jan. 27, 2015, entitled SYSTEM AND METHOD OF CONTENT STREAMING AND DOWNLOADING, which provisional patent application is incorporated herein by reference in its entirety.

FIELD OF THE DISCLOSURE

The present disclosure generally relates to communications networks and, more particularly but not exclusively, to information and content distribution systems.

BACKGROUND

Cable television service providers, satellite television service providers and other television or content distribution companies offer numerous broadcast channels as well as on-demand content to subscribers via set top boxes (STBs) and other customer premise equipment (CPE), as well as customer devices such as computers, smart phones and the like.

Service provider equipment supporting on-demand content delivery to subscribers may initially have been designed to accommodate a particular type of subscriber device (e.g., a set top box within a cable television system) or particular type of content source (e.g., a traditional cable television content provider). Unfortunately, while existing service provider equipment and/or system architectures may be ideal for delivering content from a particular content source to a particular subscriber device, the provider equipment and/or system architecture may be less than ideal for other content sources and/or subscriber devices.

SUMMARY

Various deficiencies in the prior art are addressed by systems, methods, architectures, mechanisms or apparatus for streaming content toward client devices, comprising a content delivery system configured to automatically ingest content asset packages and publish identifying data associated with content assets encrypted and stored therein at a content delivery network (CDN), a virtualized Digital Rights Management (DRM) platform configured to provide content encryption keys to the content delivery system and to authorized client devices, and a virtualized services platform configured to interact with client devices to authenticate client devices, receive client device content requests, and cause the CDN to transmit requested content to an authorized client device.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
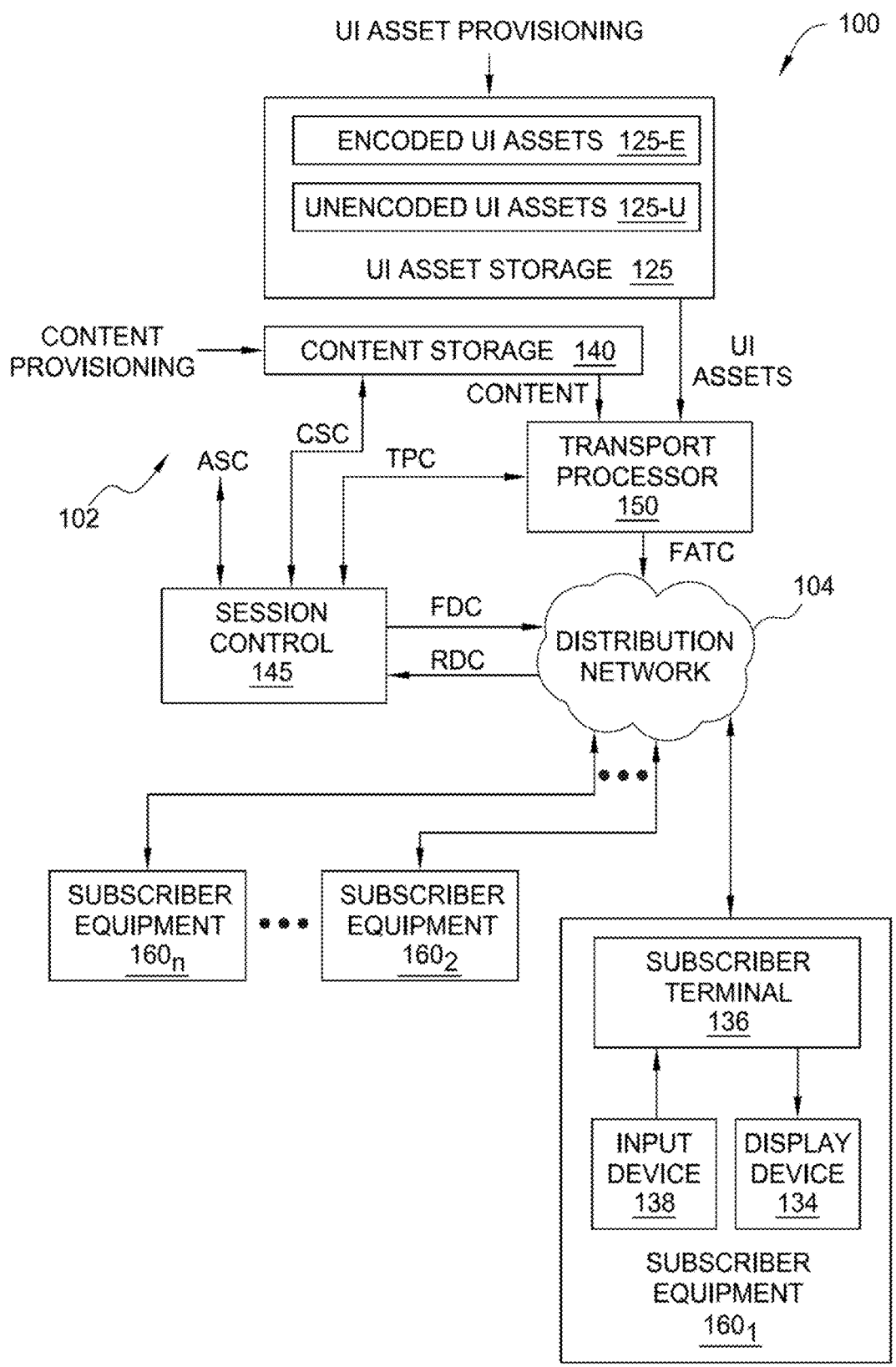
FIG. 1 depicts a high-level block diagram of an interactive information distribution system.

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

IP VOD Architecture.

Various embodiments will be described within the context of information distribution system including a highly efficient, highly scalable IP VOD architecture enabling rapid and automatic ingesting of content asset packages and subsequent video on demand (VOD) distribution of ingested content via streaming or download.

The IP VOD architecture includes a number of systems and entities for performing various functions, such as processing received content to normalize format and/or transport characteristics of content asset packages, storing content asset packages and advertising content availability to subscribers, providing metadata associated with stored content asset packages to content discovery platforms to enable subscriber discovery of available content, interacting with subscriber devices to perform device authentication, subscriber authorization and other tasks to determine whether subscriber is entitled to receive the content, initiating content streaming and/or download sessions to deliver content to subscribers and so on.

Various embodiments contemplate implementing these systems/entities as a combination of virtual and nonvirtual systems/entities. Generally speaking, those systems/entities tasked with content ingestion and storage/distribution functions are implemented in a non-virtualized manner, while those systems/entities tasked with managing content storage/distribution, managing subscriber interaction, determining and enforcing digital rights and so on are implemented as virtualized services within, illustratively, a data center or cloud environment. Further, in some virtualized services embodiments, those virtualized services associated with digital rights management, generation of encryption keys and other content-related services may be instantiated separately from those virtualized services associated with subscriber interaction, authorization, session management, billing/accounting and other subscriber-related services.

Thus, an IP VOD architecture according to one embodiment comprises a non-virtualized content delivery system cooperating with a virtualized subscriber services system and a virtualized digital rights management system. In this manner, special-purpose content processing/transmission servers and other types of hardware and hardware/software combinations are used to perform these functions, whereas subscriber management services and content management services are implemented as virtual services using general purpose computing and storage resources such as provided via a data center or via an infrastructure as a service (IaaS) provider.

FIG. 1 depicts a high-level block diagram of an interactive information distribution system. Specifically, FIG. 1 depicts a high-level block diagram of an interactive information distribution system 100 capable of supporting various embodiments of the present invention. The system 100 contains service provider equipment 102, a distribution network 104 and subscriber equipment 106.

The system 100 of FIG. 1 is depicted as a heterogeneous system in that subscriber equipment 106 may comprise subscriber terminals, also known as set-top terminals (STTs) or set-top boxes (STBs), of differing capability with respect to control processing, bandwidth and/or graphics processing; generally speaking, differing capabilities in terms of processing resources and memory resources. However, subscriber equipment 106 capable of implementing the various embodiments described herein includes a basic or minimal level of functionality, such as an ability to decode an MPEG-2 transport stream including video information (and associated audio information) and process the decoded video (and associated audio information) to produce video (and audio) streams or signals suitable for use by a presentation device.

The distribution network 104 may comprise one or more of a Hybrid Fiber Coax (HFC) for cable, optical network, IP network, Plain Old Telephone System (POTS) for ADSL, terrestrial broadcast system like MMDS or LMDS, or satellite distribution system like DBS.

The service provider equipment 102 comprises a user interface (UI) asset storage module 125, a content storage module 140, a session controller 145 and a transport processor 150.

The UI asset storage module 125 is used to store UI assets such as encoded UI assets 125-E or unencoded UI assets 125-U. The encoded UI assets 125-E may comprise still or moving UI imagery (e.g., UI screens) encoded according to MPEG or other video encoding formats. The UI assets may be stored in several forms, such as unencoded, encoded but not transport packetized, encoded and transport packetized and the like. In various embodiments, the UI assets are stored as transport packets according to a specific protocol, such as MPEG-2 transport packets. In this manner transport encoded UI asset packets may be easily multiplexed into a transport stream being formed.

The content storage module 140 is used to store content such as movies, television programs and other information offerings. The content may be stored in several forms, such as unencoded, encoded but not transport packetized, encoded and transport packetized and the like. In various embodiments, the content is stored as transport packets according to a specific protocol, such as MPEG-2 transport packets. In this manner transport encoded content may be easily multiplexed into a transport stream being formed.

The transport processor 150 combines or multiplexes content and/or UI asset data as needed to provide an output data stream for transmission to a subscriber via a forward application transport channel (FATC) within the distribution network 104. In various embodiments, the transport processor 150 performs transport packetizing functions for content and/or UI asset data as needed in conformance with the FATC transport protocols. In various embodiments, the transport processor 150 also performs video encoding functions such as MPEG encoding of unencoded UI assets.

The session controller 145 (or session manager) provides session control of the information flowing to and from the UI asset storage module 125 and content storage module 140. The session controller 145 provider controls communications between the server equipment 102 and subscriber equipment 106, such as between a cable system head-end and one or more set-top terminals. The session controller 145 produces an asset storage control signal ASC for controlling and communicating with the UI asset storage module 125, a content storage control signal CSC for controlling and communicating with the content storage module 140, and a transport processor control signal TPC for controlling and communicating with the transport processor 150.

The session controller 145 sends data, such as commands, encryption keys and the like to subscriber equipment 106 via a forward data channel (FDC). The session controller 145 receives subscriber equipment data, such as information stream requests, session initiation data (set-top identification, capability, and the like), user clickstream information and/or other data from subscriber equipment 106 via a reverse data channel (RDC).

The FDC and RDC are supported by the distribution network 104 and may comprise relatively low bandwidth data channels, such as 1-2 megabits per second data channels utilizing QPSK, QAM or other modulation techniques. The FDC and RDC are also known as "out of band" channels, while a relatively high bandwidth forward application transport channel (FATC) is also known as an "in-band" channel. In various embodiments, the session controller 145 contains interface devices for sending control information via the forward data channel FDC and receiving control information via the reverse data channel RDC using so-called "out of band" carrier frequencies.

The distribution network 104 can be any one of a number of conventional broadband communications networks that are available such as a fiber optic network, a telecommunications network, a cable television network and the like. In various embodiments, distinct FATC, FDC and RDC channels are not used. For example, in various embodiments the distribution network 104 may comprise an IP network that may include more than one access network, may traverse core Internet networks, may traverse third-party networks and so on.

The transport processor 150 provides various forward content channel transmission interface functions of the system 100 of FIG. 1. Specifically, the transport processor 150 is coupled to subscriber equipment via the forward applications transport channel (FATC). In various embodiments, the forward application transport channel (FATC) is supported by the distribution network 104 and comprises a relatively high bandwidth communications channel well suited to carrying video, audio and data such as, for example, multiplexed MPEG-2 transport packets. It should be noted that data normally conveyed to a set-top box via the FDC may be included in the FATC data stream.

The transport processor 150 contains a multiplexer or combiner for multiplexing or combining the content information stream CONTENT provided by content storage module 140 and the asset information stream ASSETS provided by asset storage module 125.

The subscriber equipment 106 comprises, illustratively, a subscriber terminal 136, display device 134 and input device 138. The subscriber terminal 136 may comprise a set-top terminal, set-top box, communications terminal, computer, hand-held tablet or other computing device, smartphone and/or other device capable of interacting with the service provider equipment 102 via the distribution network 104. The display device 134 may comprise any display device, such as a conventional television, computer monitor, the computer display, a smart phone display and so on. The input device 138 may comprise any input device, such as a remote control, a keyboard, a touch screen device and so on. Generally speaking, the subscriber terminal 136 receives from the input device 138 data indicative of user interaction with the input device 138. Generally speaking, the subscriber terminal 136 provides presentation signals of still or moving imagery suitable for presentation via the display device 134.

Figure 2:
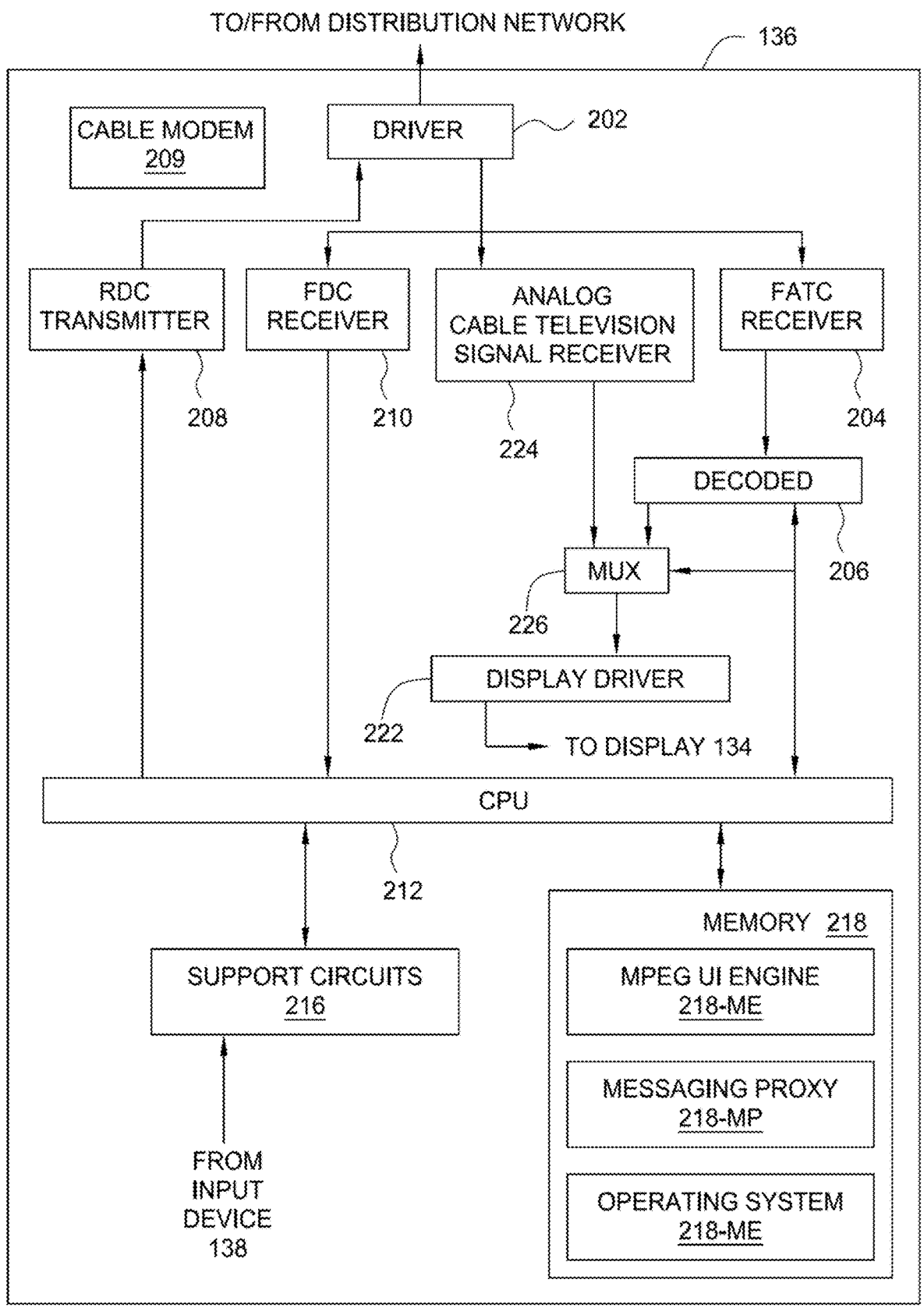
FIG. 2 depicts a high-level block diagram of an exemplary subscriber terminal suitable for use in the interactive information distribution system of FIG. 1.

FIG. 2 depicts a high-level block diagram of an exemplary subscriber terminal suitable for use in the interactive information distribution system of FIG. 1. Specifically, FIG. 2 depicts a high level block diagram of a subscriber terminal 136 comprising a diplexer 202, a back channel (RDC) transmitter 208, an information channel (FATC) receiver 204, a command channel (FDC) receiver 210, an information decoder (e.g., MPEG decoder) 206, a conventional television signal receiver 224, a multiplexer 226, a display driver 222, various support circuits 216, a processor 212 and memory 218. In various embodiments, the subscriber terminal includes a cable modem 209 operative to communicate with a broadband connection (not shown) to thereby implement various functions associated with the RDC, FDC and/or FATC.

The diplexer 202 couples the (illustrative) three channels of the distribution network carried by a single cable to the transmitter 208 and receivers 204 and 210.

Each receiver 204 and 210 contains any necessary tuners, amplifiers, filters, demodulators, depacketizers, decoders and so on, to tune, downconvert, and depacketize and otherwise retrieve the signals from the distribution network. The information channel receiver 204 may contain a conventional "in-band" QAM demodulator or other appropriate high-bandwidth demodulator. Control channel receiver 210 may comprise an "out-of-band" QPSK demodulator for handling command channel data carried by the forward data channel.

The decoder 206 processes data packets carrying information provided by the QAM demodulator to provide useable signals for the display device 134 or other presentation device or recording device. The decoder 206 operates to decode audiovisual streams such as compressed elementary video streams, MPEG video streams, MPEG-2 transport streams and so on as appropriate. The decoder 206 is in communication with and controlled by the controller 212.

The conventional cable television signal receiver 224 contains a tuner and conventional analog television demodulator, illustratively an ATSC, DVB, NTSC, PAL or SECAM demodulator.

The multiplexer 226 selectively couples the demodulated analog television signal from the television signal receiver 224 or the decoded video signal from the decoder 206 to the display drive 222, which conventionally processes the selected signal to produce a presentation or video signal suitable for use by, illustratively, the display device 134. The multiplexer 226 is in communication with and controlled by the controller 212.

Thus, each subscriber terminal 136 receives data streams from the FATC or FDC, demodulates the received data streams and, in the case of video streams, decodes or otherwise processes the demodulated video streams to provide video presentation streams suitable for use by display device 134. In addition, the subscriber terminal 136 accepts commands from the remote control input device 138 or other input device. These commands are formatted, modulated, and transmitted through the distribution network 104 to the session controller 145. This transmission may be propagated via the RDC, though any communication channel capable of propagating data to the service provider equipment 102 may be used. Subscriber terminal 136 for different subscriber equipment 106 may vary in the format of encoding and/or transport protocol supporting, such as supporting one or more of MPEG-2, MPEG-4, DVB and/or other encoding or transport protocols.

Within the set-top terminal 136, the controller 212 is supported by memory 218 and various support circuits 216 such as clocks, a power supply, an infrared receiver and the like. The memory 218 is depicted as including various program modules, including MPEG UI engine 218-ME, a messaging proxy 218-MP and an operating system 218-OS. The operation of these various program modules will now be described with respect to an MPEG UI generation function.

IP VOD Storage and Streaming Platform

Generally speaking, various embodiments find particular utility within the context of an interactive information distribution system such as a cable television system providing to its subscribers a number of consumer-facing products enabling subscribers to select and receive desired content on demand. An exemplary IP VOD storage and streaming platform suitable for supporting IP VOD content streaming to a subscriber via a mobile app, set top box (STB) and/or other client device will now be discussed in more detail.

A client device application denoted as the Charter TV App (CTVA) is part of a TV Everywhere (TVE)/Next Generation TV (NGTV) program which merges several areas of IP-based developments in one set of consumer-facing products having a similar look and feel from the perspective of the subscriber. The purpose of CTVA is to offer value-add services to new and existing video and internet subscribers in the form of video content deliverable to a variety of devices. The CTVA offers various features to residential consumers such as live streaming of content, an interactive program guide to select content, a "kid zone" limiting content selection/delivery according to parental controls as well as companion features enabling subscribers to tune specific content channels, set DVR recording parameters and watch lists, and perform various account management functions. The operation of CTVA will be described below and further with respect to the client device FIG. 5.

In one embodiment, an IP VoD Streaming and Download to Go (D2G) product is contemplated wherein CTVA provides subscribers with an ability to initiate playback of on-demand content on a mobile device and/or download on-demand content onto a mobile device to watch while offline. The delivery platform may be configured to support streaming of assets to mobile devices as well as delivering IP based VoD to traditional TV STBs and other client devices.

In Home and Out of Home streaming of FVoD and SVoD assets with advanced programming rights to deliver to authenticated video and broadband subscribers, as well as access to browse and initiate STB playback of all (FVoD, SVoD & TVoD) VoD listings.

"Download to Go" allows the user to temporarily store a video file on select viewing devices for later "offline" viewing. Based on business rules, the eligible content expires as dictated by the individual programmers. The first programming available for users is a subset of Showtime and Starz SVoD content.

Figure 3:
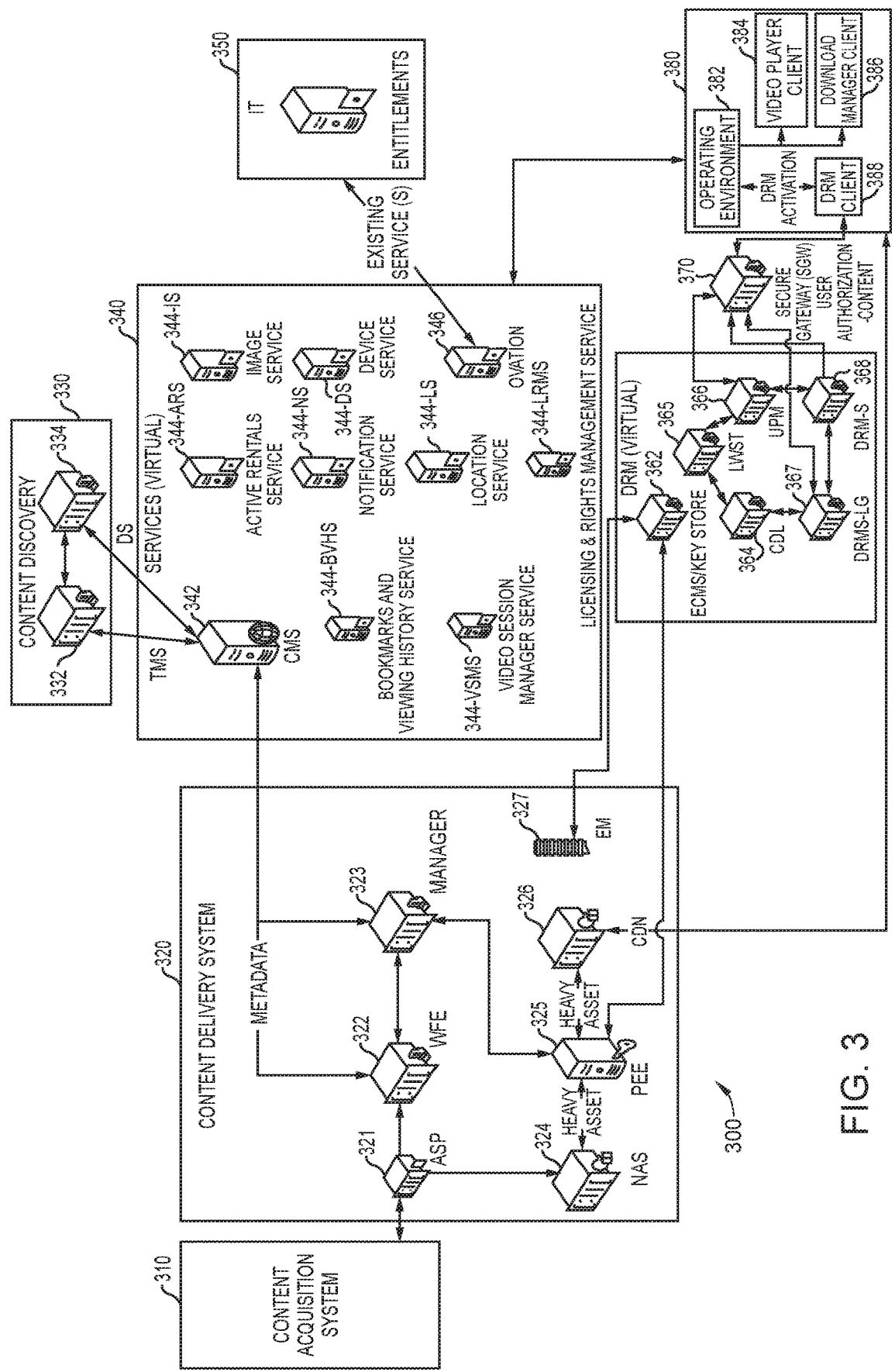
FIG. 3 depicts a logical representation of an Internet Protocol Video on Demand (IP VOD) architecture in accordance with one embodiment.

FIG. 3 depicts a logical representation of an Internet Protocol Video on Demand (IP VOD) architecture in accordance with one embodiment and suitable for use in supporting IP VOD features and functions described herein with respect to the embodiments. In particular, the architecture 300 of FIG. 3 provides a video storage and streaming platform to support IP VoD streaming and download services (e.g., CTVA & .NET). Various platform functions may include automating asset ingest workflow, content storage, packaging, encryption, and streaming. This platform may further include or integrate with digital rights management (DRM) platforms, content management system (CMS) platforms, content aggregation systems, content delivery networks (CONS) and/or various other systems and functional elements.

The disclosed architecture 300 generally comprises a content acquisition system 310, a content delivery system 320, an optional content discovery platform 330, a virtualized content management system services platform 340, and entitlements platform 350, a virtualized digital rights management platform 360, at least one Secure Gateway (SGW) 370, at least one client device 380 executing a local application or app in accordance with the various embodiments. Numerous variations upon this architecture are contemplated by the inventors and be readily understood by those skilled in the art in view of the specification. Further, various portions of the disclosed architecture are simplified to improve clarity of the specification.

Major functions of the disclosed architecture comprise content acquisition, content asset delivery, and content storage and streaming functions.

Content Acquisition

Content acquisition functions are performed primarily using the content acquisition system 310. Generally speaking, the content acquisition system 310 receives and aggregates content assets from one or more content providers (not shown) and process the content assets for subsequent use by content asset delivery, content storage and content streaming functions. Such processing may include, illustratively, transcoding content assets to adapt bit rate, frame rate, frame format and/or other parameters, performing quality control (QC) processing of transcoded content assets and so on. Processed content assets are then provided to the content delivery system 320 in one or more of several appropriate formats. In the exemplary embodiments, content assets are delivered to the content delivery system 320 as a .tar package, though other packages and/or formats may be used.

Content Asset Delivery

Asset delivery functions are performed primarily using the content delivery system 320. Generally speaking, the content delivery system 320 receives content assets from the content acquisition system 310 as part of a content ingestion process. The content delivery system 320 as depicted contemplates specific protocols and techniques to achieve the functions described. However, those skilled in the art will appreciate that other protocols and/or techniques may also be used to achieve the various functions. For example, while various network elements will be described as using the Active Server Pages (ASP) scripting environment as well is the ASP.net server-side web application framework and related technologies, other mechanisms, environments, frameworks and/or technologies may also be employed to provide these functions.

Referring to FIG. 3, the client device 380 is depicted as a set top box (STB), smart phone, tablet or other client or subscriber device capable of receiving and processing streaming and/or download content data from the CDN 326 in accordance with subscriber authorization, DRM requirements and so on to provide a presentation signal associated with the content data. The client device 380 is generally depicted as including an operating environment 382, the video player client 384, a download manager client 386 and eight DRM client 388.

The operating environment 382 comprises the hardware and hardware/software combination used to implement the basic client device functions to enable device operation, interaction with provider equipment/services, user input output, presentation of audiovisual imagery (or signal for use by external presentation device is) and so on. The operating environment 382 may include hardware or a combination of hardware and software for implementing one or more of the video player client 384, download manager client 386 or DRM client 388. In various embodiments, one or more of the video player client 384, download manager client 386 or DRM client 388 is implemented as a standalone module within the client device 380.

Referring to FIG. 3, the content delivery system 320 is depicted as including an ASP server 321, a work flow engine 322, a manager node 323, a network-attached storage (NAS) device 324, a packaging and encryption engine 325, the content delivery network (CDN) server 326 and an encryption module 327.

Within the context of the present embodiments, the workflow engine 322 defines and automates a work flow for automatic content ingestion, which will be described more detail with respect to FIGS. 3-4.

The workflow associated with receiving content assets, processing the content assets and delivering the content assets to the content delivery system may be automated as part of a content ingestion process. Specifically, ASP server 321 receives content assets from the content acquisition system 310, such as from an ASP server 14 therein. In various embodiments, each ASP server comprises an Aspera FASP transfer server hosted on a Fabrix video grid management node. Aspera FASP is a point to point transfer protocol operating in accordance with a client/server model and incorporating user authentication, forward error correction (FDC), encryption and session management into all transfers. A FASP client initiates a transfer session with a FASP server via TCP prior to transferring the payload. This session setup involves user account authentication, negotiated transfer speed, and transfer session segment identification. Once the session is setup via TCP, the payload is delivered via UDP at the negotiated transfer rate. While the transfer is being performed the client and server communicate via TCP to identify the segments sent, received, and any missing segments that need to be resent. Advantageously, Aspera FASP has very little overhead allowing it to maximize throughput and simplify bandwidth management functions.

Workflow engine 322, illustratively the workflow automation tool from Aspera denoted as Orchestrator, maybe used to logically define and automate a work flow. Within the context of the content asset ingest mechanism, some or all of the following functions are performed: (1) recognize that a new content asset has arrived and that transfer of the content asset from the content acquisition system 310 is complete; (2) parse or otherwise examine the content asset to identify and ingest ADI XML (marketing metadata), D3Manifest XML (technical metadata) and/or other metadata included with the received content asset; (3) unpack the .tar file containing adjustable bit rate (ABR) and/or other variants of the content asset; (4) validate a checksum or other error information associated with each variant; (5) publish content to CDN Origin and publish ADI metadata to CMS.

For management of the content ingest workflow, Aspera Orchestrator is integrated with the Charter CMS, Fabrix NAS, Fabrix management API's, and Aspera FASP transfer server. Orchestrator integrates with the Fabrix NAS via NFS for file staging and prep. It integrates with the Fabrix origin and processing via the Fabrix API's. The API's allow for management of all origin content including publishing to the origin as well as deleting assets from the origin. Orchestrator is integrated with the Charter CMS via an Amazon S3 bucket and its own API. Upon content ingest, orchestrator publishes all metadata to the CMS via the Amazon S3 bucket. For management of content in the origin, the CMS uses an API hosted by Orchestrator to manage content deletion. Aspera Orchestrator is also integrated with the Aspera FASP transfer server via a hot folder. The Aspera transfer server receives files and writes them to a folder on the Fabrix NAS that the Orchestrator is monitoring. Once the Orchestrator sees an .xml metadata file in the folder, it begins the content ingest workflow.

Figure 4:
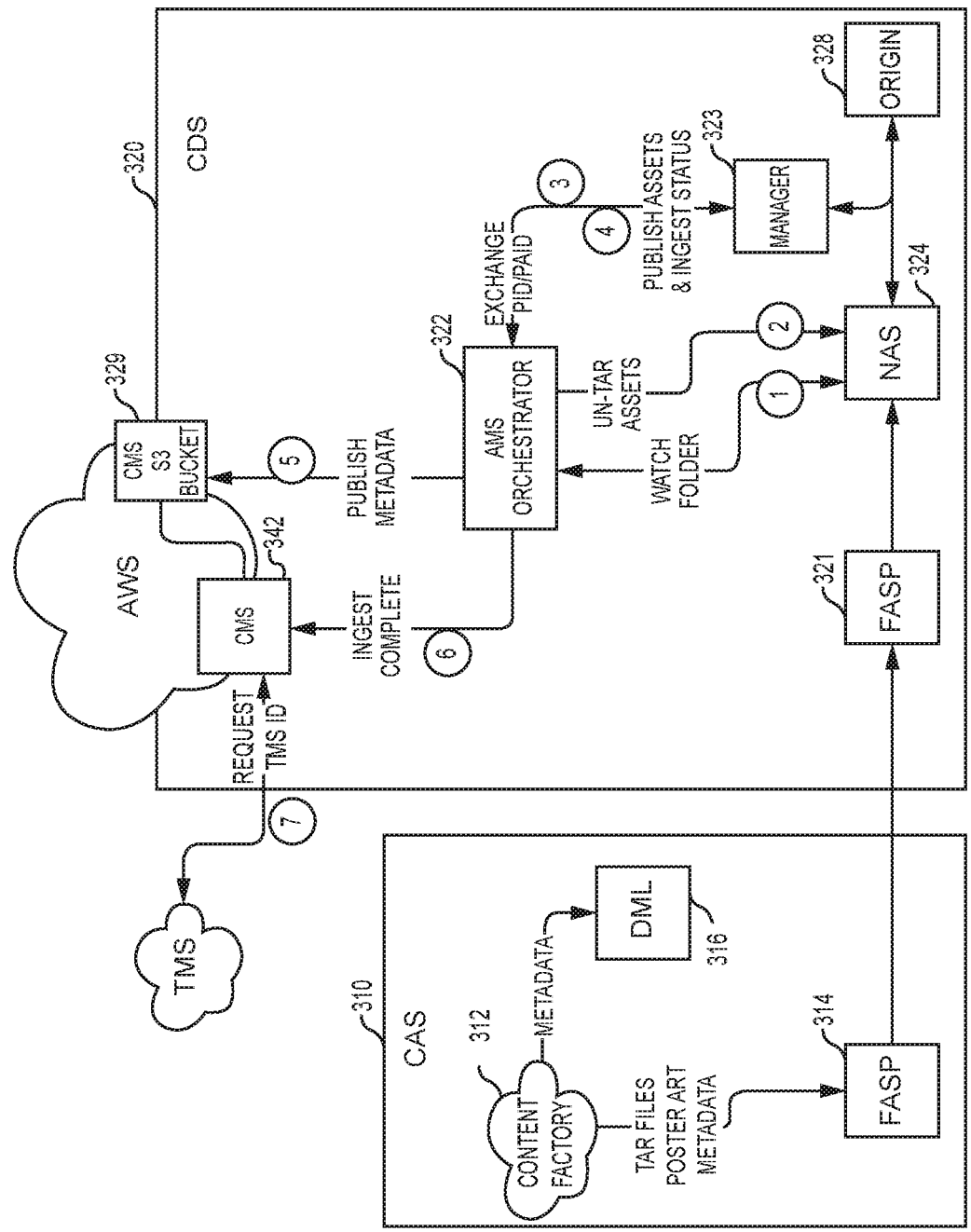
FIG. 4 depicts a portion of the architecture of FIG. 3 implementing a content ingestion workflow routine according to one embodiment.

FIG. 4 depicts a portion of the architecture of FIG. 3 implementing a content ingestion workflow routine according to one embodiment.

The architecture 400 of FIG. 4 depicts a content acquisition system 310 including the content factory 312 providing content assets such as .tar files, poster art, metadata and the like to a Fabrix ASP server 314 which, in turn, provides the content assets to a Fabrix ASP server 321. In addition, the content factory 312 provides metadata associated with the content assets to a media library 316. The CDS 320 receives content assets via the Fabrix ASP server 321, which stores receive content assets in a Fabrix NAS 324.

At step 1, WFE 322 (illustratively an AMS orchestrator) has been monitoring a folder on Fabrix NAS 324 waiting for the arrival of a content assets terminating file or other data indicative of receipt of all files associated with a content asset package by NAS 324. In various embodiments, the terminating file comprises a ADI .xml file, which illustratively references a content/movie tar, a preview tar, poster art and the like within the content asset package. In other embodiments a different terminating file may be used and/or a data signal or flag may be used. Upon detecting the terminating file, data signal or flag, WFE 322 initiates an ingest workflow routine.

At step 2, WFE 322 repeatedly communicates with NAS 324 to determine the progress of the asset ingest process, such as by using get_ingest_progress requests in the Fabrix Content Management API.

At step 3, upon receiving a communication from NAS 324 indicative of completion of the asset ingest process, WFE 322 initiates a process with NAS 324 and/or manager node 323 to unpack or un-tar one or more tar files containing asset variants within the ingested content asset package.

At step 4, the assets are published by, illustratively, a Fabrix Content Management API. That is, WFE 322 calls a create_asset request in the Fabrix Content Management API to publish asset variants to the Fabrix Origin 328. In various embodiments, the API call contains the ADI PIO/PAID to associate with the content asset in the Fabrix system.

At step 5, the 322 publishes the content asset metadata is published via, illustratively, HTTP post to the content management system S3 bucket 329. That is, WFE 322 posts the ADI .xml file and the D3Manifest.xml to an Amazon S3 bucket that the CMS 342 is monitoring.

At step 6, the content asset ingest is complete. The WFE 322 reports the status of the asset ingest to the CMS 342 is complete and, therefore the content asset is available and streamable.

At step 7, a request for TMS ID is made by, illustratively, FTP. That is, the CMS 342 sends asset metadata to TMS to obtain a TMS ID for the asset.

Referring to FIG. 3, optional content discovery platform 330 may comprise third-party functions adapted to enable subscriber discovery of content, such as by using Tribune Media Services' (TMS) metadata products via a TMS server 332 and/or Digitalsmiths' discovery products via a DS discovery server 334. Optional content discovery platform 330 may be accessed via CMS 342 or other appropriate entity.

Virtualized content management system services platform 340 is depicted as comprising CMS 342, Active Rentals Service 344-ARS, Image Service 344-IS, Bookmarks and Viewing History Service 344-BVHS, Notification Service 344-NS, Device Service 344-DS, Video Session Manager Service 344-VSMS, Location Service 344-LS and License & Rights Management Service 344-LRMS. In addition, novation server 346 is depicted as communicating with entitlements platform 350 to help ensure appropriate use of content.

Virtualized DRM platform 360 is depicted as comprising ECMS/key store 362, which interacts with encryption model 327 of content delivery system 320 to generate thereby encryption keys, which are provided to packaging and encryption engine 325, which encrypts relevant portions of delivered content asset packages received by the content delivery system 320.

The virtualized services and services platforms described herein may be implemented using third-party cloud computing/storage services such as Amazon Web Services (AWS), third-party data centers and/or captive data centers or virtual services providers. These virtualized services may be implemented as tenant services within the context of a third-party or captive virtual services provider. These virtualized services may be implemented using an architecture comprising a large number of general purpose computing and storage resources interconnected via various communications protocols and managed by hypervisors and other virtual services management tools to enable instantiation of virtualized services and services platforms (or portions thereof) as described herein.

Content Storage and Streaming

Content storage and streaming may be implemented using various embodiments. For example, various embodiments contemplate accommodating storage and streaming requirements for IP VoD using a solution from IBM/Fabrix. The Fabrix Video Grid is a storage cluster and processing grid. The platform is 100% software and runs on generic Linux COTS servers with direct attached storage. The platform consists of two logical components:

The VIDFX is the processing component of the grid and offers a full complement of media manipulation functions such as ingest (real time live and/or file based), streaming, packaging, transcoding, recording, splicing for ad-insertion, and encryption. The processing components are built as applications on top of the grid. These applications gain efficiencies by tying directly into the storage component of the grid.

The NASFX is the storage component of the grid. NASFX offers file and object based storage. At its core the NASFX is based on the Fabrix scale out file system (FXFS). This is a high performance distributed file system that aggregates resources from every server in the cluster to form a unified storage and processing grid.

The Fabrix Video Grid provides NAS storage for staging and processing of the VoD assets in the ingest workflow. The Video Grid also provides the VoD origin storage for streaming the assets from the CDN. For streaming and download services the platform may be integrated with existing Akamai CDN used for live IP streaming services. The Akamai CDN is already deployed and in use today.

Along with storage the Fabrix Video Grid also provides the processing functions for the ingest workflow as well as asset streaming. The video grid indexes and validates proper compression and transport encoding (e.g., MPEG) formatting of each asset variant upon ingest. This provides a level of QC for the assets as well as creating an ATIS C2 Index file for use in trick file generation for CDN Assisted VoD. The video grid also provides just in time packaging and encryption for asset streaming.

Fabrix Integrated NAS/Origin. Exemplary Fabrix video grid comprises a cluster of servers wherein substantially all of the available storage is shared between the NAS (file based) storage and the origin (object based) storage. The storage platform is managed by the Fabrix manager. Access to the storage sub-system is abstracted from all 3rd party systems. An NFS interface is available for accessing the NAS and Fabrix offers a set of APIs for publishing and managing data in the origin storage.

Fabrix/Aspera Integration. One embodiment comprises a platform integrating Aspera FASP and Orchestrator services on Fabrix manager nodes. In this embodiment, Aspera FASP ES and Aspera Orchestrator are installed on both of the manager nodes. The Fabrix manger nodes are configured in a hot/warm failover configuration. The Aspera products support high availability in the same way; however, hosting the Aspera services and the Fabrix services on the same machine provided improved separation to avoid any degradation of Fabrix services. In various embodiments, Fabrix manager services are provided via a primary Fabrix manager server and the Aspera services are setup to run primary on the backup Fabrix manager nodes. In response to a failure, the services may be executed using the same server.

Fabrix API. The Fabrix platform is managed by the manager node. The manager node is responsible for managing all VIDFX and NASFX services. The manager node 323 exposes web interfaces that enable one to easily administer the entire system. All storage (NAS, Origin) and application (packager, encrypter, streamer) services are accessible via a set of API's provided by Fabrix. A list of the available API's and what they are responsible for is provided below:

Content Management Interface:
   Content Ingest
   Content Ingest Progress
   Encryption
   Content Deletion
   View/List VoD Assets
   VoD Asset Video Properties
Composite Actions Interface:
   Supports multiple actions to perform a workflow
      Example: Ingest+Transcode+Encrypt asset
Content Processing Interface:
   Fetch File
   Monitor Progress
   Transcode
   Package
   Encrypt
   Cancel Task
   Ingest
Video Notification Interface:
   Notify $3^{rd}$ Party systems of video session states
      Session State Change (setup, tear down)
      Asset State Change Fabrix Packaging, Encryption, Streaming & DRM Integration. The Fabrix VideoGrid has a set of applications that are built into an application layer, which is integrated with their storage sub-system for expedited access to the storage in the cluster. This allows for speedier and more efficient storage read/writes, which in turn provides for better application performance.

Packager Overview. Just-In-Time (JIT) packaging saves assets in storage as a single transport stream file until they are packaged (segmented) at the time of request for streaming. The alternative to JIT packaging is to package on ingestion of the asset. When packaging during the process, the various embodiments may predefine all of the packaging criteria (ABR format, segment size, IDR alignment, segment life span, etc). When the files are packaged on ingest they are segmented and written to disk as hundreds, or thousands of small files and wait to be individually requested for streaming. The benefits to using JIT packaging include the ability to package to different ABR formats (HLS, Smooth, HDS, DASH) at the time of request and providing support for multiple ABR formats from a single source file instead of thousands of small files (and multiple versions of the source to support each ABR format). JIT packaging also allows the system to change any of the packaging criteria dynamically because there is no need to re-process the files. Any changes will take effect the next time an asset is requested. The system also gains storage efficiencies when storing a single source file for each asset as opposed to hundreds or thousands of small segments for each source.

Encrypter Overview. And encryption engine such as the Fabrix encryption engine may be used. The encryption engine is called as a part of the streaming session to encrypt the asset before streaming it to the client. For example, various embodiments utilize a Fabrix encrypter integrated with Cisco VideoGuard encryption. The Cisco VideoGuard Connect DRM may be used for CTVA and Web streaming as well as downloading. The Fabrix Video Grid encryption engine integrates with the Cisco VideoGuard DRM keystore to exchange the encryption keys for use in encrypting the VoD assets when streaming. In various embodiments, all content is stored in the origin unencrypted, being encrypted when requested for streaming or download.

Streamer Overview. The streaming engine (such as the streaming engine within the Fabrix video grid platform) is preferably capable of progressive and adaptive bitrate (ABR) streaming. The streaming engine integrates with the packager and encrypter as necessary. The streaming engine analyzes streaming services requests using a variable passed in the streaming services request. Various embodiments of the system provide predefined playback profiles and/or device profiles suitable for use when making streaming requests. These profiles define many streaming variables that can be applied at the time of request and these profiles provide information that informs the streamer that it needs to invoke the packager and/or encryption engine prior to streaming.

ABR Streaming Workflow. When an asset is ingested in the VideoGrid, it is indexed to a file containing a mapping to all i-frames for that asset. When a streaming request comes into the Fabrix streamer, the index file is used for streaming, packaging, and encryption of the asset.

In an exemplary production environment for support of ABR streaming, when the Fabrix manager receives the client request for streaming, it initiates a streaming session by allocating a Session ID and directing the client to a node in the cluster for streaming. The manger communicates to the streaming node that a new streaming session has been initiated and it passes the Session ID.

All future client requests for that asset will go to the node to which the manager directed the client. When the streamer on that node receives the client request, it initiates a streaming session and reference the Session ID that was it was passed from the manager, then it contacts the packager to generate the top-level manifest file for the asset. The manifest is generated using the asset index file that maps all of the i-frame locations in each variant for the asset.

Once the top-level manifest is generated, it is passed to the streamer for the response to the client. Once the client has the manifest it requests the variant level manifest. When the streamer receives the client request, it contacts the packager to generate the variant level manifest files for the asset.

The packager calls the encrypter engine to request the DRM encryption key reference from the Cisco/NDS keystore in AWS. The key request API is called and the keystore responds with the encryption key reference. The encrypter passes the key reference to the packager for inclusion in the variant manifest.

Once the variant manifest is completed, it is passed to the streamer for response to the client request. When the client receives the variant level manifest, it starts requesting the ABR file segments referenced in the manifest playlist. When the streamer receives the request for each segment, it calls the packager to package the file segment based on the index file mapping and packaging criteria contained in the device profile referenced in the client request (segment size, ABR protocol, segment life span, etc). The packager pulls the file segment from the asset, and package it as a .ts (broadly a tar or similar format) file. Then it calls the encryptor engine to perform encryption.

The encrypter engine encrypts the segment and pass it back to the packager. The packager then passes it back to the streamer for response to the client. All interactions are logged in the streamer.log on the streaming node and referenced by the Session ID.

After the client receives the encrypted segment, it will use the key reference in the variant manifest to locate the decryption key. Once it gets the decryption key, it will decrypt the segment and add it to the playback buffer for playout.

Fabrix Scaling. The Fabrix VideoGrid is a clustered hardware platform. It consists of 2 management nodes (HA) to manage the cluster and seven data nodes for storage and streaming applications. It is very easy to scale storage, I/O, and streaming capabilities. The platform scales linearly. If more storage is needed then another data node may be added to gain additional memory (e.g., 56 TB) in the overall cluster storage. If more streaming capacity is needed, then adding another data node may be added to gain additional streaming capabilities/bandwidth (e.g., 10 Gbps) of overall streaming capabilities.

Figure 5:
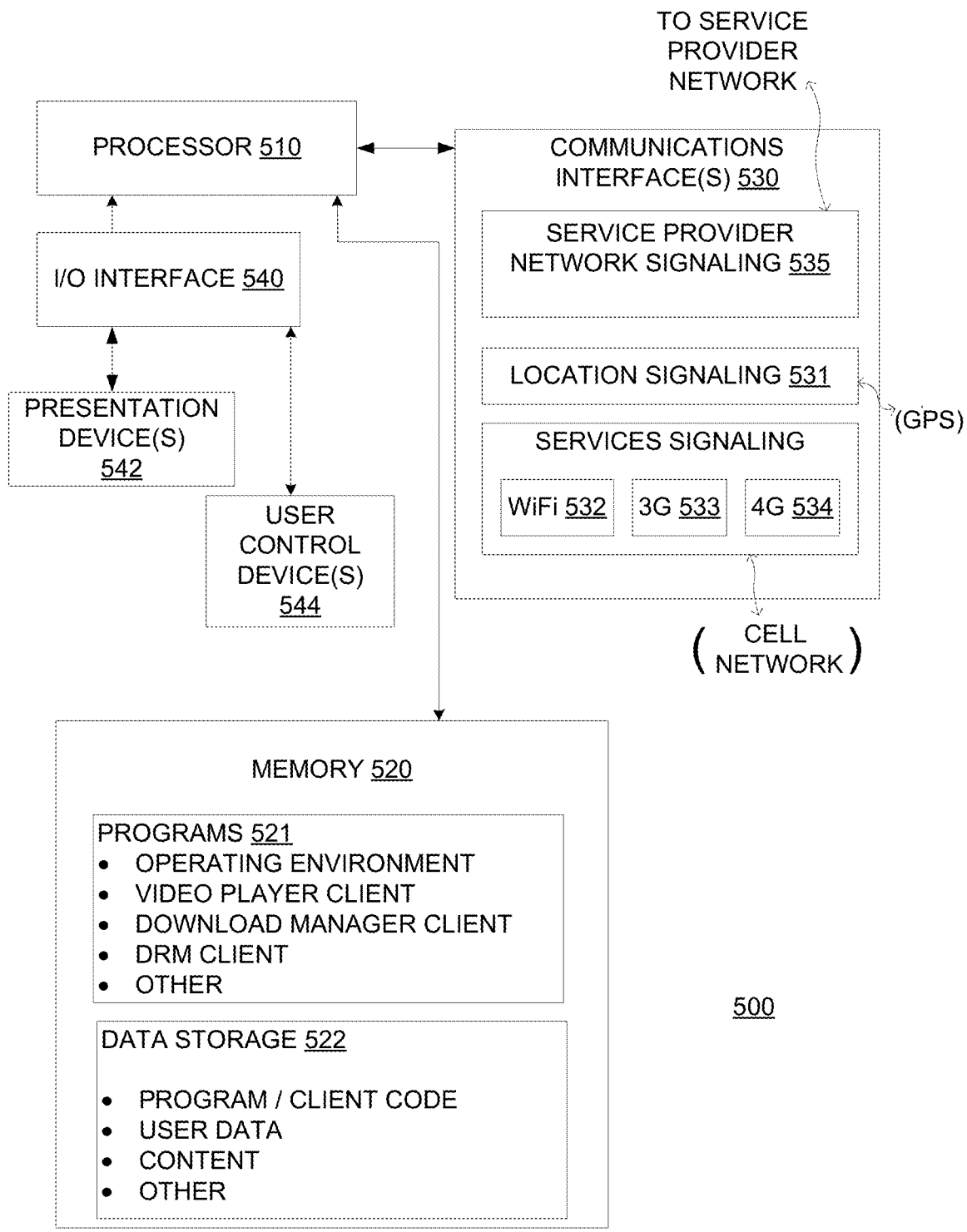
FIG. 5 depicts a high-level block diagram of a client device suitable for use in various embodiments described herein.

FIG. 5 depicts a high-level block diagram of a client device suitable for use in various embodiments described herein. The client or subscriber device 500 of FIG. 5 is suitable for storing in memory program instructions which, when executed, perform various client device functions such as described herein. The client device 380 may comprise a set top box (STB), mobile phone, tablet computer or other client device.

As depicted in FIG. 5, the client device 500 includes a processor 510, a memory 520, communications interfaces 530, input-output (I/O) interface 540, presentation interface(s) 542, and user control device(s) 544. The processor 510 is coupled to each of memory 520, communications interfaces 530, and I/O interface 540. The I/O interface 540 is coupled to presentation interface(s) 542 for presenting information on a presentation device (not shown; such as a mobile phone display screen, computer monitor, television and the like) and is coupled to user control interface(s) 544 (not shown; such as a mobile phone touchscreen, computer keyboard or graphical user interface, remote control device and the like) for enabling user control of client device 500.

The processor 510 is configured for controlling the operation of client device 500, including operations to enable user interaction with content selection and discovering mechanisms (e.g., local or remote electronic program guides, content recommendation engines and the like), service provider accounting systems, service provider troubleshooting systems and the like. Further, processor 510 is configured for performing the various client functions described herein.

The memory 520 is configured for storing information suitable for use in providing the various client functions described herein. Memory 520 may store programs 521, data 522 and the like. Within the context of a mobile device such as a smart phone, the programs 521 may comprise applications or apps retrieve from an appropriate app store website.

In various embodiments, programs 521 may include one or more of an operating environment, video player client, download manager client, DRM client or other program. In various embodiments, data storage 522 may include one or more of program/client code, user data, content and/or other data. The memory 520 may store any other information suitable for use by client device 500 in providing the various client functions described herein.

The communications interfaces 530 may include a location signaling interface such as a global positioning GPS and or cellular telephone tower triangulation system to determine the location of the client device 500. The communications interfaces 530 include one or more services signaling interface such as a Wi-Fi or WiMAX interface 532, a 3G wireless interface 533, and/or a 4G wireless interface 534 for supporting data/services signaling 126 between client device 500 and external communications and services infrastructure/network 106. The communications interfaces 530 may include service provider network signaling interfaces 535, such as for IP network connectivity, forward application transport channel reception and so on. It will be appreciated that fewer or more, as well as different, communications interfaces may be supported.

The I/O interface 540 provides an interface to the presentation interface(s) 542 and user control device(s) 544 of client device 500.

The presentation interface(s) 542 includes any presentation interface(s) suitable for use in presenting content or user interaction information associated with the operations of client device 500. For example, the presentation interface(s) 542 may include a display screen, one or more speakers, and the like, which may be used for displaying data, displaying video, playing audio, and the like, as well as various combinations thereof. The typical presentation interfaces of client device devices, including the design and operation of such interfaces, will be understood by one skilled in the art.

The user control interface(s) 544 include any user control interface(s) suitable for use in enabling the user of the client device 500 to interact with the client device 500. For example, the user control interfaces(s) 544 may include touch screen based user controls, stylus-based user controls, a keyboard and/or mouse, voice-based user controls, and the like, as well as various combinations thereof. The typical user control interfaces of client devices, including the design and operation of such interfaces, will be understood by one skilled in the art.

Although primarily depicted and described as having specific types and arrangements of components, it will be appreciated that any other suitable types and/or arrangements of components may be used for client device 500. The client device 500 may be implemented in any manner suitable for enabling the advertising presentation and transaction capability described herein.

The video player client and download manager client provide respective mechanisms by which content may be streamed or downloaded to the client device from the service provider. For example, various embodiments contemplate a mobile device app enabling subscribers to stream or download live television, on-demand content, prerecorded content, personal digital video recorder (DVR) content and the like to the mobile device. Various embodiments contemplate a similar app or application operable within the context of a smart television, set top box (STB), computer or other device for providing similar content streaming and downloading capability. All of these applications may be adapted according to the various embodiments to support the functions described herein. Various embodiments use cloud-based infrastructure to distribute streaming and download to go content in virtual systems supports service, entitlements, DRM and linear streams The operating environment, video player client, download manager client, DRM client and/or other programs 521 provide various functions associated with the client device. Such functions may include one or more of the following:

UI interaction function. The UI interaction function comprises enabling user interaction via a graphical user interface presented via a smart phone display, television display and the like. In various embodiments, UI interaction indicative of content selection, target device selection and so on is conducted via a subscriber device within the context of a session or other data interaction with a server provider device. The service provider device may comprise a head end, content server, session manager or other network elements. Selected content is delivered to the target device via a content delivery session instantiated between the target device and content serving device. In various embodiments, content delivery may be provided via a third party server, access network server and so on.

Session Control. The session control function enables the client device 500 to interact with head end session controller 145 to authenticate the client device and facilitate various other session management functions.

Content Selection. The content selection function enables user interaction with program guides and the like to select content for streaming or download. Specifically, content associated with a particular subscriber such available via live television, video on demand, subscriber content stored at a remote or local Digital Video Recorder (DVR) and so on may be selected for streaming or download by the content selection program.

Location detection. The location detection function enables automatic determination of the location of the client device 500. In this manner, where the location of the client device is determined to be a customer location authorized to receive subscriber services, those services may be provided to the client device without further subscriber or device information (e.g., without additional username or password requirements). In a similar manner, network services not authorized for a particular location may be withheld from a client device determined to be at that particular location. Since network services may comprise streaming or downloading content as described herein.

Automatic client device registration. The automatic client device registration function provides automatic registration of the client device 500 for purposes of receiving content streams or downloads without additional subscriber or device information (e.g., without additional username or password requirements).

Automatic client device registration change. The automatic client device registration change function provides for automatic registration of the client device from a first subscriber account and reregistration of the client device to a second subscriber account upon detecting that the location of the client device is associated with the location associated with the second subscriber account. If enabled, this process is performed by (1) the client device detecting a location and propagating a location to the head end session manager; (2) the head end session manager determining that the location is associated with the second subscriber account and that automatic device registration change is enabled at the client device and by the second subscriber account; (3) the head end session manager determining the customer services associated with the second subscriber account and therefore made available to the reregistered client device; and (4) the session manager providing the client device session authorization information pertaining to available network services (e.g., streaming or downloading of content such as via the vision channels, VOD, remote DVR and the like) without requiring additional subscriber or device information (e.g., without additional username or password requirements).

Presentation/target device toggling. The presentation/target device toggling function enables subscribers to dynamically toggle between (i.e., select) different presentation/target devices. For example, content being streamed or downloaded to a first client device (e.g., a set-top box in the living room of a home) might instead be automatically streamed to a second client device (e.g., a set-top box in the bedroom of the home). Device toggling may be implemented expressly by user interaction indicative of a desired toggling action. Device toggling may be implemented automatically where a second presentation/target device is enabled to receive streamed or downloaded content in the event of a termination of active content streaming or downloading at a first presentation/target device (e.g., streaming content being displayed via a smart phone is terminated in favor of that streaming content instead being displayed via a television or other presentation device). In various embodiments, additional on demand UI screens provide a presentation device selection UI screen(s) to receive subscriber input indicative of a presentation device selection associated with particular on-demand content. In one embodiment, a user may select or "toggle" a particular presentation device, such as shown in the figures where each of a "watch on iPhone" and "watch on TV" selection is provided to a user.

Device dependent content selection. The device dependent content selection function comprises enabling subscriber access to only a subset of available content, such as only that content capable of being presented or stored via a particular client device, only the content authorized for streaming/downloading by a subscriber, only that content authorized by the content provider to be streamed or downloaded during particular time periods, days, dates and so on. Generally speaking, content may be selected from a subset of the available titles based upon user subscription, target presentation device capability, licensing restrictions and/or other criteria. For example, where a subset of available on-demand content is allowed to be presented only via certain presentation devices (e.g., STB but not phone), selection of a restricted presentation device may result in a subscriber being unable to select or even if view such content within the context of the on-demand UI selection screens when such restricted device is already selected.

Metered bandwidth use management. The metered bandwidth use function comprises a mechanism by which bandwidth-related parameters associated with streamed or downloaded content may be adapted to reduce bandwidth usage. In one embodiment, where a selected presentation device is associated with metered bandwidth (e.g., 3G/LTE networks) or limited internal memory or processing resources, a "video quality" prompt may be provided to enable user selection of streaming or downloading of the content at a lower quality level. For example, a user may prefer to stream a content selection at a standard quality level using 1.2 GB of memory or bandwidth versus a higher quality level using 1.6 GB of memory or bandwidth. In various embodiments, quality level of streamed or downloaded content is automatically selected in response to available memory resources (e.g., high-quality only if minimum device memory exceeds a pre- or post-download threshold level), predefined selection criteria (e.g., high-quality only via Wi-Fi) and the like.

In various embodiments, such as where a subscriber using a STB has selected to download on-demand content to a target device such as a smart phone or other device, the downloading or transmission of the on-demand content to the smart phone or other device may be initiated immediately upon such selection, initiated after a confirming user input via the smart phone or other device, initiated after some delay or at a predefined time (e.g., late at night), initiated upon some condition being met (e.g., when the target device is connected to any Wi-Fi or to a network particular WAP) and so on.

In various embodiments, a download queue is provided wherein multiple on-demand content titles may be sequentially or contemporaneously downloaded to one or more target devices. In various embodiments, downloaded and downloading content is stored in particular folders on a target device, such as a "My Library" folder, "Downloads" folder or some other folder. In various embodiments, previously downloaded content is automatically deleted from the target device of the subscriber in the event of the subscriber terminating his or her subscription, the downloaded content longer being included within the subscription (e.g., content a longer available via MSO platform), the expiration of a time period within which the subscriber device must connect to a content provider or cable television provider platform to verify subscriber status and/or other criteria.

Various embodiments contemplate an app for use on a smart device; wherein the app interacts with a content provider or transport server to facilitate the download and presentation of selected content. In various embodiments, the app enables subscriber client devices to perform functions such as watching live TV, streaming/downloading on-demand content, searching for programming and other UI functions.

Any of the various embodiments discussed herein may be implemented within the context of an information distribution system such as a telecommunication, cable television, satellite or other network adapted according to the embodiments, a system according to any of the embodiments, hardware and/or software according to any of the embodiments, a set-top box and related server/transport entities according to any of the embodiments and so on.

Figure 6:
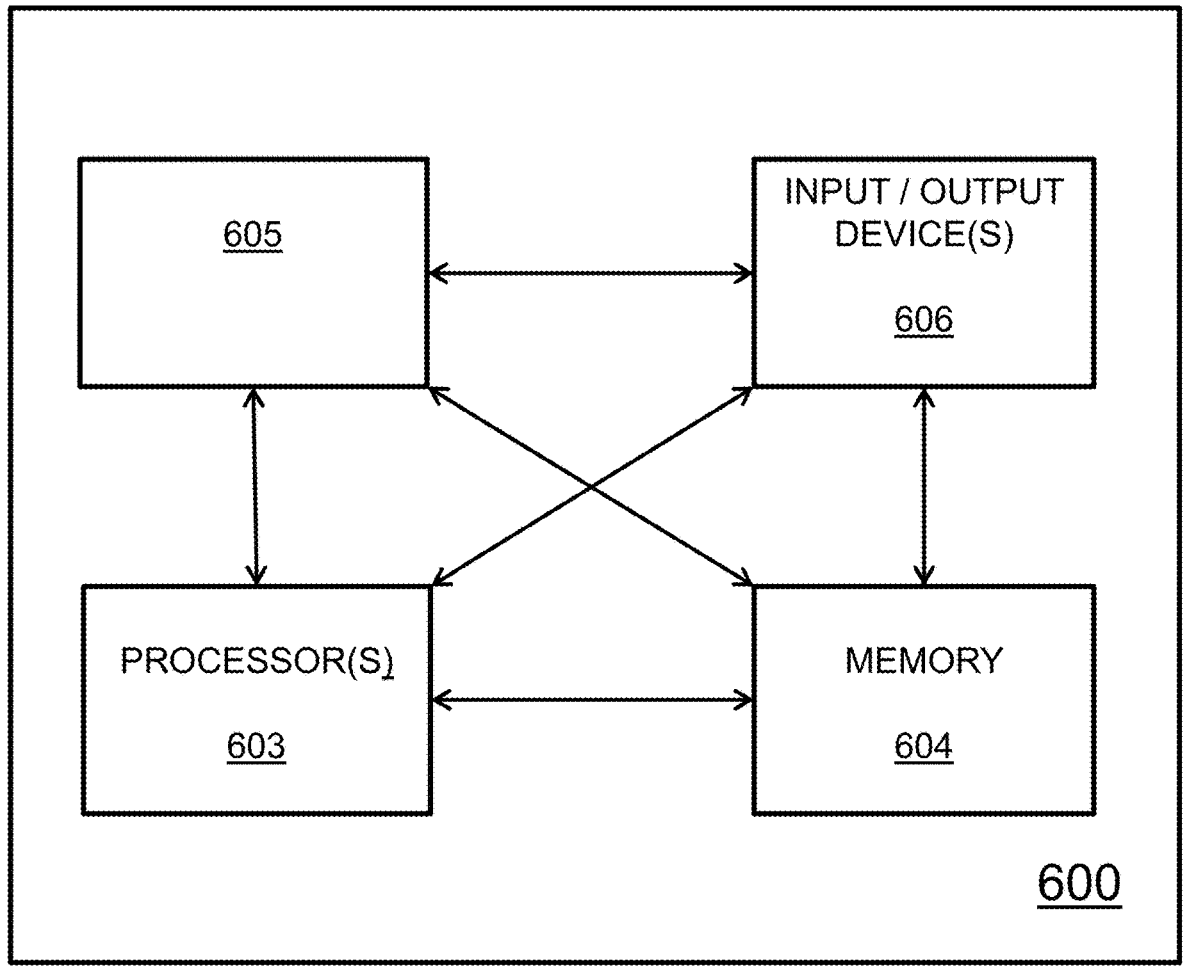
FIG. 6 depicts a high-level block diagram of a computing device suitable for use in performing the functions described herein.

FIG. 6 depicts a high-level block diagram of a computing device, such as a processor in a network element, suitable for use in performing functions described herein such as those associated with the various elements described herein with respect to the figures.

As depicted in FIG. 6, computing device 600 includes a processor element 603 (e.g., a central processing unit (CPU) and/or other suitable processor(s)), a memory 604 (e.g., random access memory (RAM), read only memory (ROM), and the like), a cooperating module/processor 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A system including provider equipment operatively coupled to client devices for propagating content toward authorized client devices, comprising:
    a computer implemented services platform configured to receive client device data, to authenticate client devices, to receive client device content requests, and to cause a content delivery network CDN to transmit requested content to an authorized client device;
    wherein the services platform is configured to determine that an authenticated client device registered to a first subscriber account is located at a subscriber location associated with a second subscriber account and, without additional client device input, to reregister the authenticated client device to the second subscriber account such that the authenticated client device may be provided with respective second subscriber account authorized services at the subscriber location associated with the second subscriber.

2. The system of claim 1, wherein the services platform is configured to reregister the client device to the second subscriber account if such reregistration is enabled at the client device and by the second subscriber account.

3. The system of claim 1, wherein the services platform cooperates with a session manager to receive thereby subscriber device communications, and each client device is configured to detect its respective location and propagate the location information toward the session manager.

4. The system of claim 3, wherein the session manager is configured to provide, without additional client device input, client device session authorization information pertaining to the respective subscriber account authorized services.

5. The system of claim 4, wherein the session manager is configured to terminate a service being provided to a first registered client device at a customer location and continue providing the service to a second registered client device at the customer location.

6. The system of claim 4, wherein the session manager is configured to terminate the service at the first registered client device and continue the service at the second registered client device in response to a command received from the second registered client device.

7. The system of claim 4, wherein the session manager is configured to provide the service to the second registered client device in accordance with the capabilities of the second registered client device.

8. The system of claim 5, wherein the service comprises one of a streaming video service and a video download service.

9. A method of providing content to authorized client devices, comprising:
    at a computer implemented services platform configured to receive client device data, determining that an authenticated client device registered to a first subscriber account is located at a subscriber location associated with a second subscriber account and, without receiving additional client device input, reregistering the authenticated client device to the second subscriber account such that the authenticated client device may be provided with respective subscriber account authorized services at the subscriber location associated with the second subscriber.

10. The method of claim 9, further comprising:
    at the computer implemented services platform, reregistering the client device to the second subscriber account if such reregistration is enabled at the client device and by the second subscriber account.

11. A method for providing content to authorized client devices, comprising:
    at a computer implemented services platform configured to receive client device data,
    determining that an authenticated client device registered to a first subscriber account is located at a subscriber location associated with a second subscriber account and, without receiving additional client device input, reregistering the authenticated client device to the second subscriber account such that the authenticated client device may be provided with respective subscriber account authorized services at the subscriber location associated with the second subscriber; and
    wherein the session manager is configured to terminate a service being provided to a first registered client device at a customer location and continue providing the service to a second registered client device at the customer location.

12. A computer program product comprising a non-transitory computer readable medium storing instructions for causing a processor to implement a method of providing content to authorized client devices, comprising:
    at a computer implemented services platform configured to receive client device data, determining that an authenticated client device registered to a first subscriber account is located at a subscriber location associated with a second subscriber account and, without receiving additional client device input, reregistering the authenticated client device to the second subscriber account such that the authenticated client device may be provided with respective subscriber account authorized services at the subscriber location associated with the second subscriber.

* * * * *

UNITED STATES PATENT AND TRADEMARK OFFICE
CERTIFICATE OF CORRECTION

PATENT NO. : 11,997,365 B2  
APPLICATION NO. : 15/008438  
DATED : May 28, 2024  
INVENTOR(S) : Daniel Graham et al.

Page 1 of 1

It is certified that error appears in the above-identified patent and that said Letters Patent is hereby corrected as shown below:

On the Title Page

Currently Reads:
"(72) Inventors: Daniel Graham, Denver, CO (US);
Rob Martel, Denver, CO (US); Angela
Mitchell, Denver, CO (US); Christine
Haefling, Lafayette, CO (US); Peter
Brown, Greenwood Village, CO (US);
Richard J. Digeronimo, Greenwood
Village, CO (US)"

Should Read:
-- (72) Inventors: Daniel Graham, Denver, CO (US);
Lawrence Martell, Denver: CO (US); Angela
Mitchell, Denver, CO (US); Christine
Haefling, Lafayette, CO (US); Peter
Brown, Greenwood Village, CO (US);
Richard J. Digeronimo, Greenwood
Village, CO (US) --

Signed and Sealed this  
Fourth Day of March, 2025

Coke Morgan Stewart  
*Acting Director of the United States Patent and Trademark Office*